Feb. 23, 1954    J. M. O'MALLEY    2,669,892
ROLLING MILL
Filed Nov. 5, 1949    2 Sheets-Sheet 1

INVENTOR.
JOSEPH M. O'MALLEY
BY
Albert G. Blodgett
ATTORNEY

Feb. 23, 1954

J. M. O'MALLEY 2,669,892

ROLLING MILL

Filed Nov. 5, 1949

INVENTOR.
JOSEPH M. O'MALLEY
BY
Albert G. Blodgett
ATTORNEY

Patented Feb. 23, 1954

2,669,892

UNITED STATES PATENT OFFICE 2,669,892

ROLLING MILL

Joseph M. O'Malley, Worcester, Mass., assignor to Morgan Construction Company, Worcester, Mass., a corporation of Massachusetts Application November 5, 1949, Serial No. 125,784

2 Claims. (Cl. 80—56)

This invention relates to rolling mills, and more particularly to mechanism for adjusting the position of the lower roll in a horizontal mill of the type employed in the rolling of metal.

In the construction of horizontal rolling mills, it is a common practice to support the bearings for the necks of the lower roll by means of slidable wedges, each wedge having a half nut therein for engagement with a horizontal screw-threaded rod. Each rod is formed with a series of annular thrust flanges which engage semi-circular grooves in the roll housing to prevent endwise movements of the rod. In order to provide sufficient thrust-resisting area on the screw threads and on the thrust receiving flanges, the threads have to be relatively coarse and the flanges have to be relatively extensive. This adds considerably to the cost of the necessary machine work. Furthermore, the extensive thrust receiving flanges create considerable frictional resistance to the rotation of the rods, and the coarse screw threads provide a relatively low mechanical advantage for bringing about movement of the wedges. Hence considerable effort is required to turn these rods. Furthermore, with the coarse screw threads it is difficult to adjust the wedges with the desired degree of accuracy.

It is accordingly one object of the invention to provide a simple and comparatively inexpensive mechanism for adjusting the lower roll neck bearings in a horizontal rolling mill.

It is a further object of the invention to provide an adjusting mechanism for roll neck bearings which will require very little physical effort in its operation.

It is a further object of the invention to provide a simple and dependable mechanism which will facilitate the adjustment of roll neck bearings with a high degree of accuracy.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is an end elevation of the lower portion of a horizontal rolling mill;

Figure 4:
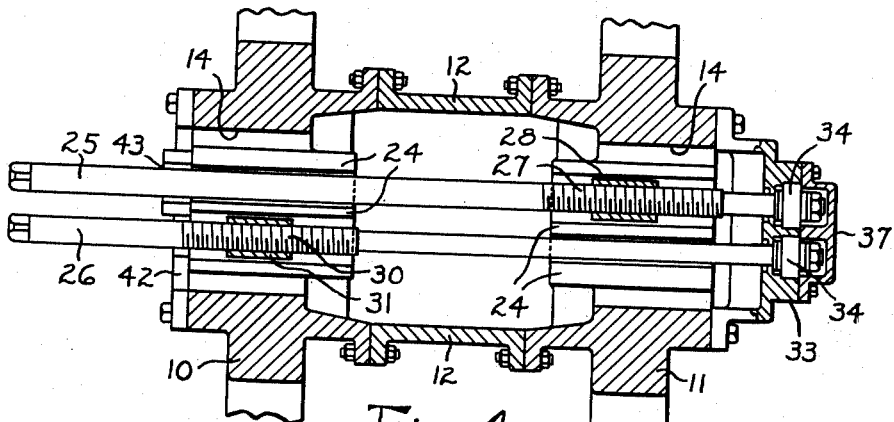
Fig. 4 is a section taken on the line 4—4 of Fig. 1.
Figure 5:
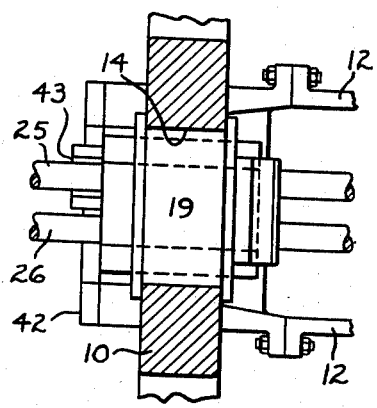
Fig. 5 is a fragmentary section taken on the line 5—5 of Fig. 1.

The embodiment illustrated comprises two horizontally spaced upright roll housings 10 and 11 with their lower portions connected by distance pieces 12. Each housing has the usual window 14. The housings support a pair of horizontal rolls, only the lower roll 15 being shown, this roll being carried by suitable roll neck bearings 16 and 17 mounted in the windows 14 of housings 10 and 11 respectively. The front bearing 16 rests on a pillow block 19, and the rear bearing 17 rests on a pillow block 20, these pillow blocks being slidable vertically in the lower portions of the respective housing windows. The lower surfaces of the pillow blocks 19 and 20 are inclined in a forward and downward direction, and these surfaces engage the correspondingly inclined upper surfaces of two wedge members 21 and 22 respectively. These wedge members are horizontally slidable, in a direction parallel with the axis of the roll 15, on suitable guide rails 24 (Fig. 4) at the bottoms of the housing windows 14.

Figure 7:
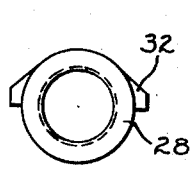
Fig. 7 is an end view of a sleeve.
Figure 8:
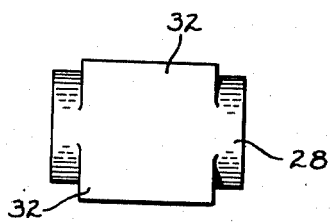
Fig. 8 is a plan view of the sleeve shown in Fig. 7.

In order to make it possible to adjust the two wedge members 21 and 22 independently, two parallel rods 25 and 26 are located in a common horizontal plane beneath the wedge members. The rod 25 is provided with a screw-threaded portion 27 which extends through an internally threaded sleeve or nut 28 of generally cylindrical form located within a recess in the bottom of the wedge member 22. The rod 26 is provided with a screw-threaded portion 30 which extends through an internally threaded sleeve or nut 31 of generally cylindrical form located within a recess in the bottom of the wedge member 21. The screw threads on the portions 27 and 30 are preferably both of the same hand, for example right hand. In addition, they are preferably of comparatively fine pitch to provide a better mechanical advantage for actuation of the wedge members and to facilitate accurate adjustment thereof. Such finer pitch is feasible for the reason that the sleeves 28 and 31 completely surround the respective rods and hence provide much stronger threads than in the case of the half-nuts previously used. As shown in Figs. 7 and 8, the sleeve 28 is provided with laterally projecting flanges 32 adapted to engage the adjacent ribs 24 and prevent rotation of the sleeve. The other sleeve 31 is similarly constructed.

Figure 2:
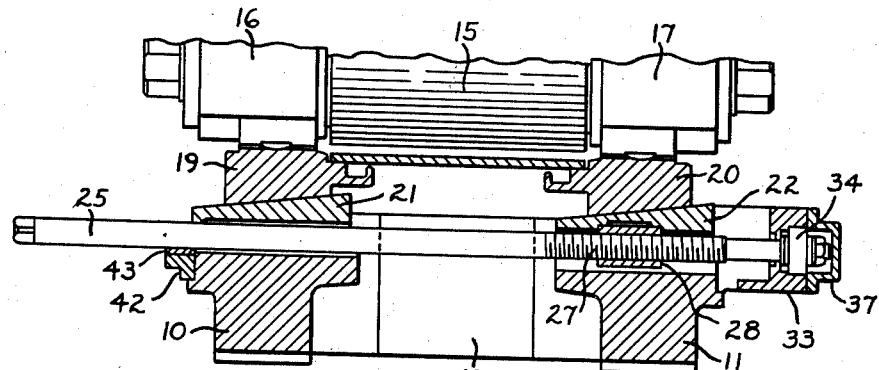
Fig. 2 is a section taken on the line 2—2 of Fig. 1.
Figure 3:
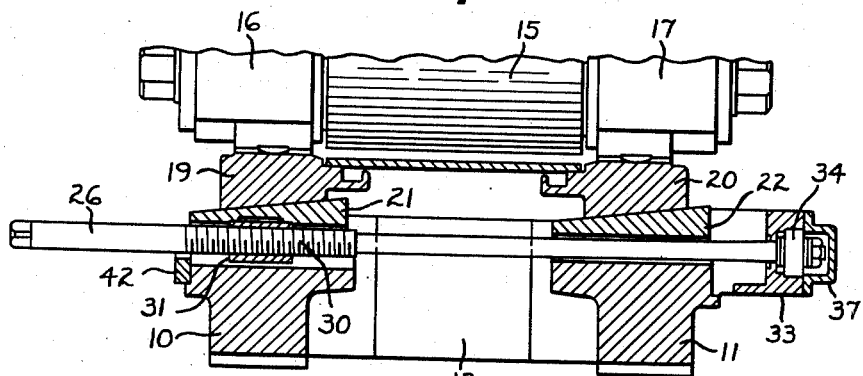
Fig. 3 is a section taken on the line 3—3 of Fig. 1.
Figure 1:
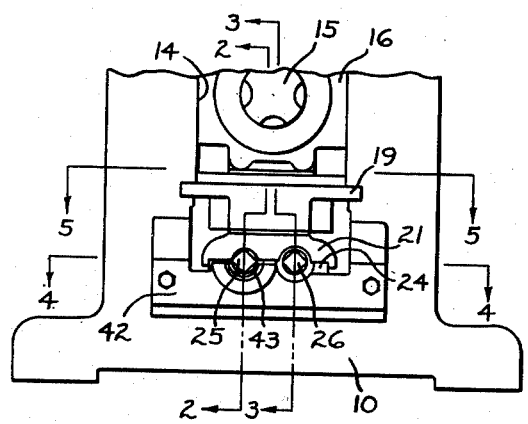
Figure 6:
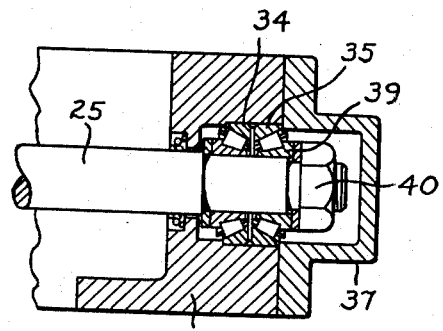
Fig. 6 is an enlargement of a portion of Fig. 2, showing certain further details in section.

The rods 25 and 26 are firmly held against axial movement, and yet are free to be rotated manually by means of suitable wrenches or handles applied to their front ends, which are squared for this purpose. As illustrated, a suitable bracket 33 is fastened to the rear surface of the rear housing 11 to form a support for a pair of anti-friction bearings 34. As shown in Fig. 6, each bearing 34 is of the well-known double-row tapered-roller type, capable of carrying not only radial loads but also axial thrust loads in either direction. The bracket 33 is recessed to receive the outer bearing races 35, which are held in place by a cap 37 secured to the bracket. The inner bearing races 39 are fastened to the rods 25 and 26 by means of nuts 40. As best shown in Figs. 1 and 2, a plate 42 is fastened to the front surface of the front housing 10, and this plate carries a half bearing 43 beneath the adjacent portion of the rod 25 to support the same.

The operation of the invention will now be apparent from the above disclosure. By turning the rod 25, the wedge member 22 may be moved in a desired direction to raise or lower the pillow block 20 and the bearing 17. Similarly, the rod 26 may be turned to move the wedge member 21 and thereby raise or lower the pillow block 19 and the bearing 16. Since the screw threads 27 and 30 are both right hand, the wedge blocks 21 and 22 both slope in a downward and forward direction, clockwise rotation of either rod will raise the corresponding bearing, whereas anti-clockwise rotation of either rod will lower the corresponding bearing. The finer screw-threads, which are made possible by the complete nuts 28 and 31, provide a reduced helix angle, which reduces the effort required to move the wedge members and at the same time makes a finer and more accurate adjustment possible. The bearings 34 take all the thrust loads with a minimum of friction. In the manufacture of the invention less machine work is required than with prior arrangements, and the construction is considerably less expensive.

Having thus described my invention, what I claim as new and desire to secure by Letters Patent is:

1. An adjusting mechanism for the lower roll of a horizontal rolling mill comprising two horizontally spaced wedge members supporting the respective roll neck bearings of the roll, each member having a recess in its lower surface, a separate internally threaded sleeve of generally cylindrical form located in each recess, two parallel substantially horizontal rods extending through the respective sleeves and having external screw threads engaging the threads within the sleeves, each sleeve extending completely around its respective rod, each rod having an end portion extending outwardly of the mill, a separate anti-friction thrust bearing engaging each said extending end portion and holding the rod against axial thrust in either direction, and a bracket fastened to one of the roll housings of the mill externally thereof, the two anti-friction thrust bearings being mounted in said bracket.

2. An adjusting mechanism as set forth in claim 1, in which the two wedge members have surfaces which slope in the same direction, and the screw threads on the two rods are of the same hand.

JOSEPH M. O'MALLEY.

References Cited in the file of this patent

UNITED STATES PATENTS

| Number | Name | Date |
|---|---|---|
| 199,459 | Morgan | Jan. 22, 1878 |
| 679,413 | Bunker | July 30, 1901 |
| 1,594,420 | Lockhead et al. | Aug. 3, 1926 |
| 1,762,292 | George | June 10, 1930 |
| 2,155,747 | Wood | Apr. 25, 1939 |